(12) United States Patent
Gandhi et al.

(10) Patent No.: US 7,747,732 B2
(45) Date of Patent: Jun. 29, 2010

(54) HOUSEHOLD INTERNET CONNECTION MONITORING AND TROUBLESHOOTING THROUGH VOICE BASED TELEPHONY DEVICES

(75) Inventors: Shailesh B. Gandhi, Boca Raton, FL (US); Peeyush Jaiswal, Boca Raton, FL (US); Pradeep P. Mansey, Coral Springs, FL (US); Anilkumar B. Patel, West Palm Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1372 days.

(21) Appl. No.: 10/731,778

(22) Filed: Dec. 9, 2003

(65) Prior Publication Data

US 2005/0144502 A1    Jun. 30, 2005

(51) Int. Cl.
*G06F 15/173* (2006.01)
(52) U.S. Cl. ...................... 709/224; 709/223
(58) Field of Classification Search .......... 709/223–224
See application file for complete search history.

(56) References Cited

U.S. PATENT DOCUMENTS

| | | |
|---|---|---|
| 5,771,354 A | 6/1998 | Crawford |
| 6,411,678 B1 | 6/2002 | Tomlinson, Jr. et al. |
| 6,580,950 B1 | 6/2003 | Johnson et al. |
| 6,584,096 B1 | 6/2003 | Allan |
| 6,714,977 B1 * | 3/2004 | Fowler et al. ............... 709/224 |
| 6,718,015 B1 * | 4/2004 | Berstis .................... 379/88.17 |
| 6,754,310 B1 * | 6/2004 | Steinbrenner et al. .... 379/29.01 |
| 2002/0065885 A1 * | 5/2002 | Buonanno et al. ........... 709/205 |

* cited by examiner

*Primary Examiner*—Shawki S Ismail
(74) *Attorney, Agent, or Firm*—Novak Druce + Quigg

(57) ABSTRACT

A method for monitoring an Internet connection can include the step of detecting a connectivity problem with a household Internet connection. A problem contact point can be determined. A communication connection that is different from the household Internet connection can be established with the contact point. For example, a voice connection can be established with the contact point. A problem notification can be conveyed to the contact point through the established communication connection.

7 Claims, 2 Drawing Sheets

HOUSEHOLD INTERNET CONNECTION MONITORING AND TROUBLESHOOTING THROUGH VOICE BASED TELEPHONY DEVICES

BACKGROUND

1. Field of the Invention

The present invention relates to the field of networking and, more particularly, to monitoring household Internet connections.

2. Description of the Related Art

Household devices enabled for Internet communications are becoming a routine part of domestic life. For example, personal computers with Internet connections, Internet enabled video game systems, and email stations have become common household contrivances. Other Internet enabled household devices can include Web-enabled audio video equipment, video surveillance devices, sprinkler systems with remote management capabilities, automated heating and cooling systems, Internet capable appliances, emergency contact devices including health monitors, and the like. All of these devices can rely upon a household Internet connection to communicate with systems and agents disposed outside the home.

At present, homeowners are generally not informed when their household Internet connection is experiencing problems. Such connectively breaks can be highly significant when a household computer acts as a Web server for a home business and when critical household functions, such as security, rely on a constant Internet connection. Even when no critical functions are performed by a household information system, a break in service can often be inconvenient to a homeowner. The problems with a household intranet loosing Internet connectivity can be exacerbated when homeowners are vacant from their home for extended periods, such as a vacation, and the homeowners rely on a household Internet connection to remotely manage the home itself or the homeowners business, personal, and financial affairs. Consequently, a method for monitoring a household Internet connection and performing remote troubleshooting tasks is needed.

SUMMARY OF THE INVENTION

The present invention provides a method, a system, and an apparatus for managing a household Internet connection. More specifically, a household Internet connection can be remotely monitored by a networked application. Whenever a problem is detected with the Internet connection, a problem notification can be conveyed to a telephony device. For example, a telephone connection can be established with a homeowner and a speech message can inform the homeowner of the problem. Further, after the telephone connection has been established, the homeowner can be prompted to select one or more troubleshooting options. These selections can be received by the networked application and one or more troubleshooting actions can be responsively performed.

One aspect of the present invention can include a method for monitoring and troubleshooting an Internet connection. The method can include the step of detecting a connectivity problem with a household Internet connection. A problem contact point can be determined. A communication connection that is different from the household Internet connection can be established with the contact point. For example, a voice connection can be established with the contact point. A problem notification can be conveyed to the contact point through the established communication connection. In one embodiment, the problem notification can include a speech message.

In another embodiment, a personalized problem report can be generated responsive to the detection of the Internet connection problem. The problem report can be text-to-speech converted and conveyed to the contact point as a speech message. Alternatively, the speech message can be a recorded speech message.

Further, at least one option for troubleshooting the problem can be provided along with the problem notification. A selection of one of the provided options can be received and an action relating to the Internet connection can be responsively performed. In one embodiment, the received selection can include a Dual Tone Multiple Frequency (DTMF) input. In another embodiment, the received selection can include a speech input.

In a particular embodiment, the method can convey a description of an Internet connectively problem to an alternative contact point if the initial contact point is unavailable. Specifically, an initial problem contact point can be determined. An attempt to establish a communication connection with the initial problem contact point can be made. When the connection attempt fails, a second contact point can be determined and an attempt can be made to establish a communication with this second contact point. Additional communication attempts can be made until either no further contacts points for reporting problems exist or until a communication connection can be established with a contact point.

Another aspect of the present invention can include a system for handling problems with home Internet connections. The system can include a household Internet connection device communicatively linked to the Internet. A connection utility can be remotely located from the household connection device and can be communicatively linked to the household Internet connection device via the Internet. The connection utility can monitor the household Internet connection. In one embodiment, the connection utility can be a speech-enabled application. A telephony device can be communicatively linked to the connection utility via a voice connection. The connection utility can automatically report problems with the Internet communication link of the home Internet connection to the telephony device. In one embodiment, the connection utility can also automatically perform at least one problem resolution action responsive to input from the telephony device. In another embodiment, an application can be remotely located from the connection utility and can be communicatively linked to the connection utility via a network. The problem resolution action performed by the connection utility can involve at least one operation executed by the application.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
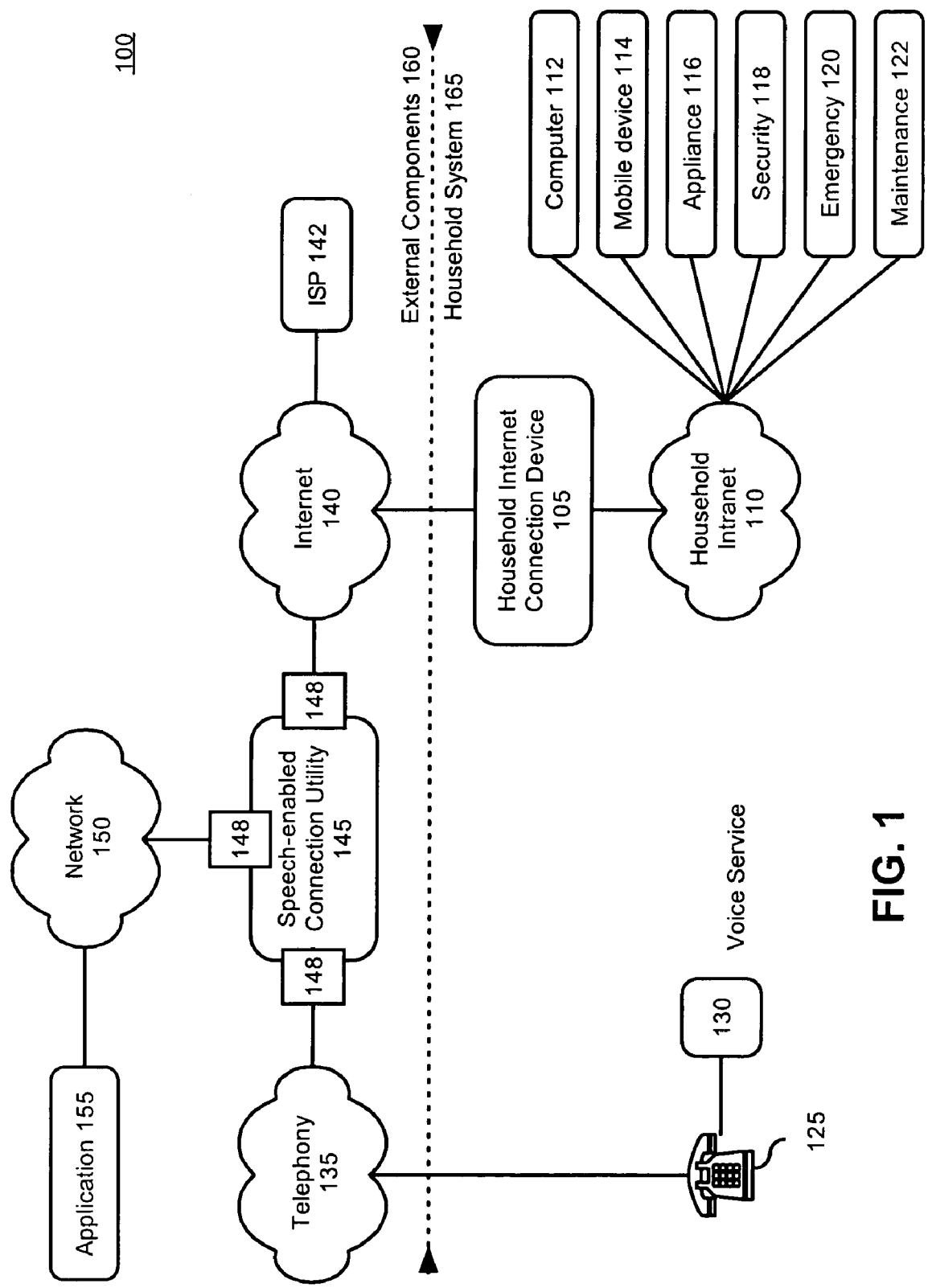
FIG. 1 is a schematic diagram illustrating a system for monitoring household Internet connections in accordance with the inventive arrangements disclosed herein.

FIG. 1 is a schematic diagram illustrating a system 100 for monitoring household Internet connections in accordance with the inventive arrangements disclosed herein. The system 100 can monitor a communication connection between a household Internet connection device 105 and the Internet 140. When communication problems are detected, a speech-enabled connection utility 145 can place a telephone call to a telephony device 125 that has been previously designated by the maintainer of the household intranet 110. The speech-enabled connection utility 145 can then vocally convey a description of the problem and present the maintainer with a multitude of problem correction options. Accordingly, the maintainer can be informed of home connectivity problems and attempt to automatically resolve the connectivity problems using the provided options.

The system 100, as presented, can include the household Internet connection device 105, the speech-enabled connection utility 145, and the telephony device 125. The household Internet connection device 105 can be any device capable of connecting the household Intranet 110 with the Internet 140. The connection between the household Internet connection device 105 and the Internet 140 can require the services of an Internet Service Provider (ISP) 142.

The nature of the household Internet connection device 105 can depend on the communication link used to establish Internet connectivity. For example, a communication link used by the household Internet connection device 105 can include, but is not limited to, a cable connection, Digital Subscriber Line (DSL) connection, an Integrated Services Digital Network (ISDN) connection, a dialup connection, a satellite connection, a wireless connection, and the like. Ergo, the household Internet connection device 105 can be an appropriate type of modem, a hub, a router, a radio receiver/transmitter, and/or the like.

The household intranet 110 can interconnect a multitude of different household devices. The household computing devices can include a computer 112, a mobile device 114, an appliance 116, a security device 118, an emergency device 120, a maintenance device 122, and other such devices. The computer 112 can include one or more computers, laptops, tablets, and/or servers. The mobile computing device 114 can include a personal data assistant (PDA), an electronic contact manager, and a cellular telephone. The appliance 116 can include a video game console, a stereo component, a television component, a coffee machine, an automated light fixture, and the like. The security device 118 can include a video camera, a microphone, a motion sensor, an alarm system, and other home security components. The emergency device 120 can include a panic button, a smoke detector, a health monitor, and/or the like. The maintenance device 122 can include a home heating system, a home air conditioning system, a sprinkler system, and similar maintenance items.

The telephony device 125 can include any device capable of conveying messages through a voice connection. Examples of the telephony device 125 can include a telephone, a cellar telephone, a pager, a fax machine, a voice mailbox, and/or the like. The telephony device can be linked to a voice service device 130, such as an answering machine so that messages can be received when a user of the telephony device 125 is unavailable. The telephony device 125 can be communicatively linked to the speech-enabled connection utility 145 via a telephony network 135, such as a mobile (wireless) network and/or the Public Switched Telephone Network (PSTN).

The speech-enabled connection utility 145 can monitor the Internet connection between the household Internet connection device 105 and the Internet 140. When problems are detected, the speech-enabled connection utility can automatically report the problem using a previously configured communication means. This communication means can provide an alternative communication connection (other than the Internet 140 connection that is experiencing problems) to contact a household system 165 from an external 160 source. In one embodiment, the alternative communication connection can utilize the telephony network 135 to contact the telephony device 125.

In addition to a series of problem detection routines, the speech-enabled connection utility 145 can include one or more troubleshooting routines. The troubleshooting routines can be initiated through a speech-input, a Dual Tone Multiple Frequency (DTMF) input, and any other input received from the telephony device 125. Troubleshooting routines can, for example, automatically reset the household Internet connection device 105, can automatically switch the communication ports between the Internet 140 server and the household Internet connection device 105, can ping the household Internet connection device 105, and can route traffic to backup systems.

The speech-enabled connection utility 145 can utilize an external application 155 during the performance of its functions. In one embodiment, the application 155 can handle speech-to-text and text-to-speech conversions for the speech-enabled connection utility 145. In another embodiment, the application 155 can be a Web service used by the speech-enabled connection utility 145. In still another embodiment, the application 155 can backup a previously defined functionality performed by the household Intranet 110 while the household Intranet 110 is down. The speech-enabled connection utility 145 can utilize one or more gateways 148 to translate messages conveyed across network 150, the Internet 140, and the telephony network 135.

It should be noted that although the speech-enabled connection utility 145 is depicted as a network element remotely located from the household Intranet 110, other embodiments are contemplated herein. For example, the speech-enabled connection utility 145 can be a monitoring utility internal to the household system 165 that is connected to or integrated with the household internet connection device 105. In such an embodiment, an external telephone line can be connected to the speech-enabled connection utility 145 so that the telephone device 125 can be contacted. Alternatively, a local connection, such as a local telephone line or wireless communication connection, can exist between the internally located speech-enabled connection utility 145 and the telephone device 125, allowing the speech-enabled connection utility 145 to communicate directly to the telephone device 125 without an external telephone line.

Figure 2:
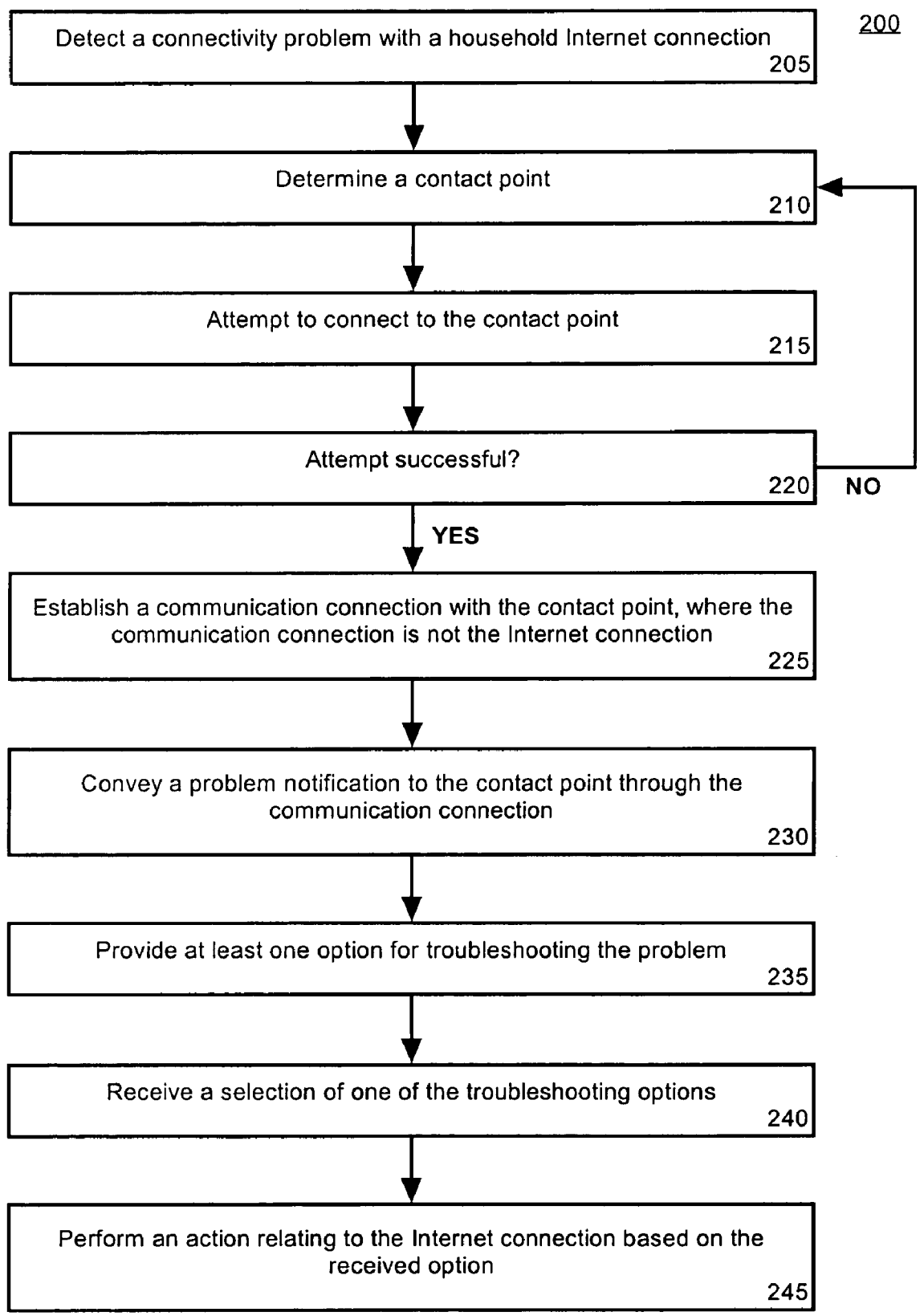
FIG. 2 is a flow chart illustrating a method for detecting household Internet problems and taking corrective actions in accordance with the inventive arrangements disclosed herein.

FIG. 2 is a flow chart illustrating a method 200 for detecting household Internet problems and taking corrective actions in accordance with the inventive arrangements disclosed herein. The method 200 can be performed in the context of a household intranet system, which is communicatively linked to the Internet. The method can begin in step 205, where a connectivity problem with a household Internet connection can be detected. In step 210, a primary contact point can be determined. For example, a telephone number for a household intranet maintainer can be specified. It should be noted that a listing of multiple contact numbers can be recorded and utilized during this step. For example, a mobile telephone number, a pager number, a work number, a fax telephone number, and the like for contacting the household maintainer can be specified in a contact list that can be utilized in this step. In step 215, an attempt can made to contact the primary contact point. For example, the telephone number for the maintainer can be called. If in step 220, the attempted contact is not successful (no one answers the call), the method can loop back to step 210 and a different contact point can be determined.

In step 225, a communication connection can be established with the designated contact point. The communication connection can be different from the Internet connection, which is experiencing problems. In step 230, a problem notification can be conveyed to the contact point through the established communication connection. For example, in one embodiment, a previously recorded message can be played over a voice connection to inform the maintainer that a problem exists with the household Internet connection. In another embodiment, a personalized problem report can be generated based upon the explicit problem, the home intranet details, and/or other contact-specific personalizations. The problem report can be an electronic document, which can be text-to-speech converted and played to the maintainer as speech.

In step 235, at least one option for troubleshooting the identified problem can be provided along with the problem notification. The maintainer can select one of these options by providing a speech response and/or a DTMF response. In step 240, the selection can be received by the application that monitors the household Internet connection. When the response is a speech input, the application can speech-to-text convert the input. In step 245, an appropriate action based upon the selection can be determined and the action can be performed, such as resetting equipment responsible for establishing the home Internet connection or rerouting traffic directed towards the home information system until the home Internet connection can be reestablished.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A household Internet connection monitoring and troubleshooting method comprising the steps of:
    detecting a connectivity problem with a household Internet connection, the household Internet connection connecting a household intranet to the Internet;
    selecting a contact point from a list of multiple contact points of a maintainer of the household, the contact points including at least one among a mobile telephone number, a pager number, a work number, and a fax telephone number;
    attempting to establish a communication connection with said contact point, wherein said communication connection is different from said household Internet connection;
    if the attempt fails, selecting another contact point from the list and attempting to establish a communication connection with the other contact point until a communication connection is successfully established with one of the contact points in the list, wherein if all attempts fail, a message is left to one of the contact point;
    conveying a problem notification to the contact point through the communication connection;
    providing at least one option for troubleshooting the connectivity problem;
    receiving a selection of one of the at least one option;
    responsively performing an action relating to the Internet connection based on the received selection of option;
    wherein said communication connection is a voice connection, and wherein said problem notification is a speech message; and
    responsive to said detecting step, automatically generating a personalized problem report; and text-to-speech converting said problem report resulting in said problem notification.

2. The method of claim 1, wherein said selection comprises a Dual Tone Multiple Frequency input.

3. The method of claim 1, where said selection comprises a speech input, said method further comprising the step of:
    speech-to-text converting said input, wherein said action is initiated responsive to said converted input.

4. A household Internet connection monitoring and troubleshooting system comprising:
    at least one memory; and
    at least one processor configured to:
        detect a connectivity problem with a household Internet connection, the household Internet connection connecting a household intranet to the Internet;
        responsive to the detecting step, automatically generate a personalized problem report;
        text-to-speech convert the problem report resulting in a problem notification;
    select a contact point from a list of multiple contact points of a maintainer of the household, the contact points including at least one among a mobile telephone number, a pager number, a work number, and a fax telephone number;
    attempt to establish a communication connection with said contact point, wherein said communication connection is different from said household Internet connection, and wherein the communication connection is a voice connection;
        if the attempt fails, select another contact point from the list and attempt to establish a communication connection with the other contact point until a communication connection is successfully established with one of the contact points in the list, wherein if all attempts fail, a message is left to one of the contact point;

convey the problem notification to the contact point through the communication connection, wherein the problem notification is a speech message;

provide at least one option for troubleshooting the connectivity problem;

receive a selection of one of the at least one option; and perform an action relating to the Internet connection based on the received selection of option.

5. A computer-readable storage medium having stored thereon, a computer program having a plurality of code sections, said code sections executable by a processor for causing the processor to perform the steps of:

detecting a connectivity problem with a household Internet connection, the household Internet connection connecting a household intranet to the Internet;

selecting a contact point from a list of multiple contact points of a maintainer of the household, the contact points including at least one among a mobile telephone number, a pager number, a work number, and a fax telephone number;

attempting to establish a communication connection with said contact point, wherein said communication connection is different from said household Internet connection;

if the attempt fails, selecting another contact point from the list and attempting to establish a communication connection with the other contact point until a communication connection is successfully established with one of the contact points in the list, wherein if all attempts fail, a message is left to one of the contact point;

conveying a problem notification to the contact point through the communication connection;

providing at least one option for troubleshooting the connectivity problem;

receiving a selection of one of the at least one option;

responsively performing an action relating to the Internet connection based on the received selection of option;

wherein said communication connection is a voice connection, and wherein said problem notification is a speech message; and responsive to said detecting step, automatically generating a personalized problem report; and text-to-speech converting said problem report resulting in said problem notification.

6. The computer-readable storage medium of claim 5, wherein said selection comprises a Dual Tone Multiple Frequency input.

7. The computer-readable storage medium of claim 5, where said selection comprises a speech input, said method further comprising the step of:

speech-to-text converting said input, wherein said action is initiated responsive to said converted input.

\* \* \* \* \*